(No Model.)
C. E. BUZBY.
SCALE BEAM AND POISE FOR TESTING MACHINES.
No. 529,160. Patented Nov. 13, 1894.
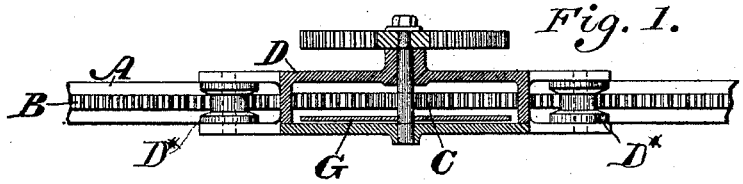
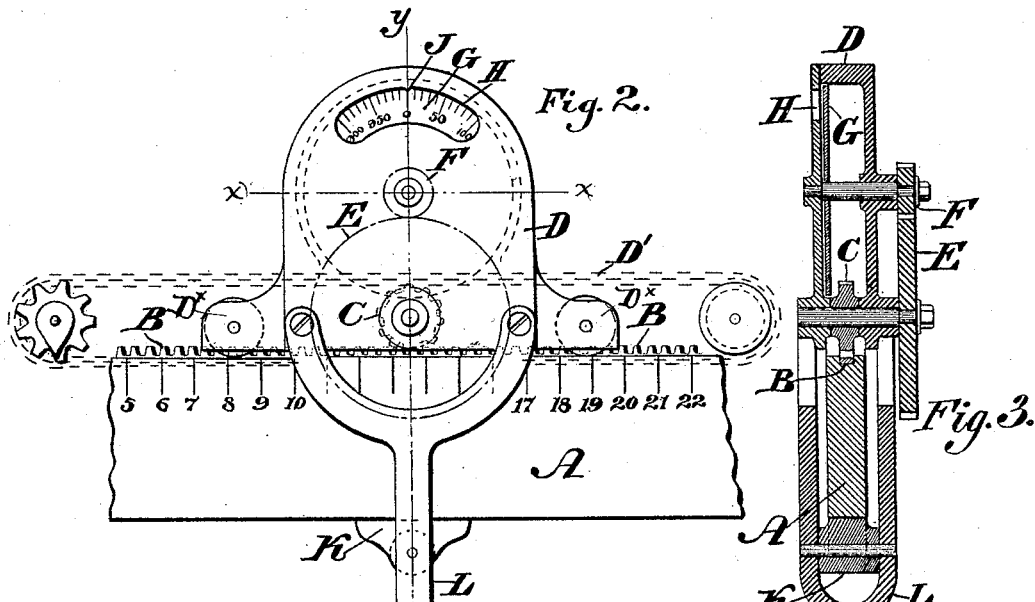
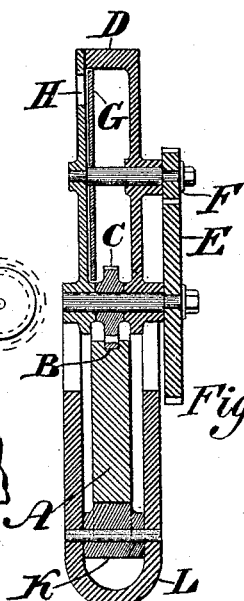
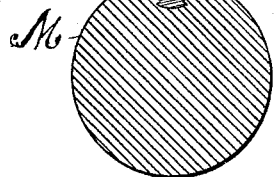
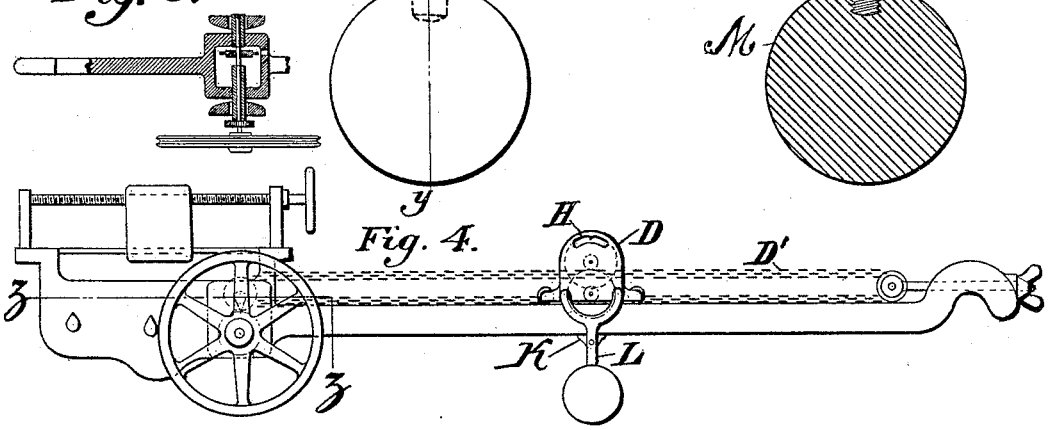
WITNESSES:
A. P. Jennings,
R. H. Graeser.
INVENTOR
Charles Ernest Buzby
BY Joshua Pedersheim
ATTORNEY.

UNITED STATES PATENT OFFICE.

CHARLES E. BUZBY, OF PHILADELPHIA, PENNSYLVANIA, ASSIGNOR TO FREDERICK A. RIEHLE, OF SAME PLACE.

SCALE BEAM AND POISE FOR TESTING-MACHINES.

SPECIFICATION forming part of Letters Patent No. 529,160, dated November 13, 1894.

Application filed July 12, 1893. Serial No. 480,206. (No model.)

*To all whom it may concern:*

Be it known that I, CHARLES ERNEST BUZBY, a citizen of the United States, residing in the city and county of Philadelphia, State of Pennsylvania, have invented a new and useful Improvement in a Scale Beam and Poise for Testing-Machines, which improvement is fully set forth in the following specification and accompanying drawings.

My invention relates to improvements in a testing machine for determining the strength and physical properties of metal or other material, as set forth in the Letters Patent of the United States No. 368,514, dated August 16, 1887, and it consists of novel means for operating the graduated or reading-off dial of the poise on the scale beam, as will be hereinafter set forth.

It also consists of novel means for checking the poise against the shock of recoil, and the displacement of the gear of the poise from the rack on the beam, when the test-specimen breaks, as will be hereinafter set forth.

Figure 1 represents a horizontal section on line $x$, $x$, Fig. 2, of a portion of a testing machine embodying my invention. Fig. 2 represents a side view thereof. Fig. 3 represents a vertical section on line $y$, $y$, Fig. 2. Fig. 4 represents a general side elevation of the beam and poise, complete and on a different scale from that shown in Fig. 2. Fig. 5 represents a horizontal section of a portion on line $z$, $z$, Fig. 4.

Similar letters of reference indicate corresponding parts in the several figures.

Referring to the drawings: A designates the main beam of the scale of a testing machine, and B designates a rack thereon, accurately fitted without end play.

C designates a pinion which meshes with said rack, and is mounted on the traveling poise or carriage D, the latter being adapted to be propelled by the endless cord or chain D' as described in the aforesaid Letters Patent. The shaft of the pinion C carries a gear wheel E, which meshes with the pinion F, the shaft of the latter having connected with it the dial plate G, whose graduations may be seen through the opening H in the casing or frame of the carriage D, it being noticed that the shaft of the pinion F and dial plate G is mounted on the casing or frame of said carriage, the said frame consisting of two parts forming a chamber in which the plate G and the pinion C are located.

When the poise is propelled, the pinion C revolves and communicates its motion to the gearing E and F, so proportioned that one revolution of the wheel E corresponds to the lateral movement of the poise required to equal a load of say one hundred or one thousand pounds according to the graduations figured 1, 2, 3, &c., required on the main beam.

The dial plate G is graduated in decimal or other parts of the circumference which revolves with the pinion F, and one revolution of this dial may then represent one thousand pounds of load, and the divisions on its circumference may represent ten pound marks if divided into one hundred parts.

On the wall of the opening H is a pointer J, which indicates the exact spot from which to take the readings when the test is accomplished.

The hanger L of the carriage is of the form of a yoke between the sides of which the carriage D is located, and each side of the yoke has two arms which are secured respectively to the lower corners of the said carriage. To a screw-threaded lower end of the yoke a weight M is attached. The opposite ends of the casing of the carriage D are provided with the divided rollers $D^\times$ which run on the scale beam A on opposite sides of the rack $B^\times$ the said rollers aiding in the easy movement of the poise on the scale beam, as well as assisting in preventing any lengthwise swaying of the poise.

In order to check the poise against the shock of recoil when the tested piece breaks, such recoil being liable to throw the pinion C out of the rack, a gib K is connected with the hanger L on the carriage D by means of a pin or shaft and adapted to slide on the planed lower side of the beam A. The gib K is in close contact with the said beam from front to rear thereof, and extends longitudinally beyond the yoke, thus preventing jumping or shifting of the carriage D in a transverse as well as longitudinal direction of the said beam.

Having thus described my invention, what

I claim as new, and desire to secure by Letters Patent, is—

1. A traveling poise or carriage for a scale beam, consisting of a casing having a shaft mounted thereon, a pinion on said shaft meshing with a rack on said scale, a rotatable dial in said casing, connecting gearing for said pinion and dial, a weighted hanger connected with the corners of said casing, rollers on said casing bearing on said scale beam, and a gib on the hanger bearing against the under side of said scale beam, said parts being combined substantially as described.

2. A traveling poise or carriage for a scale beam having a casing with a shaft mounted thereon, and carrying a pinion meshing with a rack on said scale, a rotatable shaft carrying a dial plate, a meshing gear wheel and pinion on said respective shafts outside of said casing, a weighted hanger connected with said casing, and a gib bearing against the under side of the scale beam, said parts being combined substantially as described.

3. A traveling poise with a pinion mounted thereon, and provided with rollers at its ends, a depending yoke having limbs connected with the corners of the casing of said poise, a gib in said yoke, and a scale beam with a rack thereon, said pinion meshing with said rack, and said gib being in contact with said scale beam from front to rear thereof, said parts being combined substantially as described.

CHARLES E. BUZBY.

Witnesses:
JOHN A. WIEDERSHEIM,
A. P. JENNINGS.